(12) United States Patent
Nishio et al.

(10) Patent No.: US 9,296,376 B2
(45) Date of Patent: Mar. 29, 2016

(54) VEHICLE BRAKE SYSTEM

(71) Applicant: ADVICS CO., LTD., Kariya-shi (JP)

(72) Inventors: Akitaka Nishio, Kariya (JP); Masahiro Matsuura, Chiryu (JP); Masayuki Naito, Aichi-gun (JP)

(73) Assignee: ADVICS CO., LTD., Kariya-shi, Aichi-ken (JP)

( * ) Notice: Subject to any disclaimer, the term of this patent is extended or adjusted under 35 U.S.C. 154(b) by 101 days.

(21) Appl. No.: 14/091,864

(22) Filed: Nov. 27, 2013

(65) Prior Publication Data

US 2014/0145499 A1 May 29, 2014

Related U.S. Application Data

(62) Division of application No. 13/241,017, filed on Sep. 22, 2011, now abandoned.

(30) Foreign Application Priority Data

Sep. 24, 2010 (JP) ................. 2010-213201

(51) Int. Cl.
  *B60T 1/00* (2006.01)
  *B60T 13/58* (2006.01)
  (Continued)

(52) U.S. Cl.
  CPC ............. *B60T 13/586* (2013.01); *B60L 7/14* (2013.01); *B60L 7/26* (2013.01); *B60L 11/14* (2013.01); *B60L 15/2009* (2013.01); *B60T 1/10* (2013.01); *B60T 8/4059* (2013.01); *B60T 8/4872* (2013.01); *B60T 13/686* (2013.01); *B60W 10/08* (2013.01); *B60W 10/188* (2013.01); *B60W 20/00* (2013.01);
  (Continued)

(58) Field of Classification Search
  CPC ... B60T 13/586; B60T 1/10; B60T 2270/604; B60W 20/00; B60W 30/18127; B60W 2720/406
  USPC .................................................. 303/151–152
  See application file for complete search history.

(56) References Cited

U.S. PATENT DOCUMENTS 6,328,390 B1 12/2001 Tozu et al.
6,406,105 B1 6/2002 Shimada et al.
(Continued)

FOREIGN PATENT DOCUMENTS

JP 2001-169405 A 6/2001
JP 2006-188164 A 7/2006
(Continued)

*Primary Examiner* — Anna Momper
(74) *Attorney, Agent, or Firm* — Buchanan Ingersoll & Rooney P.C.

(57) ABSTRACT

A vehicle brake system is provided with a hydraulic brake device, a regenerative brake device incorporating a generator motor, and a brake control device. The control device includes a section for calculating a driver target brake force for each wheel corresponding to a manipulation amount of a braking manipulation member, a section for enabling the brake control device itself to set compensation brake forces for respective wheels, a section for selecting a larger one of the driver target brake force and the compensation brake force for each wheel and for subtracting a base hydraulic brake force from the selected brake force to set differences for respective wheels as compensated target brake forces for the wheels, and a section for controlling the distribution of the compensated target brake force for each wheel to a controlled hydraulic brake force for each wheel and a regenerative brake force for each driving wheel.

2 Claims, 9 Drawing Sheets

(51) Int. Cl.

| | |
|---|---|
| *B60W 20/00* | (2006.01) |
| *B60T 1/10* | (2006.01) |
| *B60T 8/40* | (2006.01) |
| *B60T 8/48* | (2006.01) |
| *B60T 13/68* | (2006.01) |
| *B60W 10/08* | (2006.01) |
| *B60W 10/188* | (2012.01) |
| *B60W 30/18* | (2012.01) |
| *B60L 7/14* | (2006.01) |
| *B60L 7/26* | (2006.01) |
| *B60L 11/14* | (2006.01) |
| *B60L 15/20* | (2006.01) |

(52) U.S. Cl.
CPC ...... *B60W 30/18127* (2013.01); *B60L 2210/40* (2013.01); *B60L 2240/423* (2013.01); *B60L 2250/26* (2013.01); *B60T 2270/604* (2013.01); *B60W 2540/12* (2013.01); *B60W 2710/083* (2013.01); *B60W 2710/182* (2013.01); *B60W 2720/406* (2013.01); *Y02T 10/642* (2013.01); *Y02T 10/70* (2013.01); *Y02T 10/7077* (2013.01); *Y02T 10/7241* (2013.01); *Y02T 10/7275* (2013.01)

(56) References Cited

U.S. PATENT DOCUMENTS

| | | | |
|---|---|---|---|
| 6,598,945 | B2 | 7/2003 | Shimada et al. |
| 2007/0272457 | A1 | 11/2007 | Kodama et al. |
| 2009/0281704 | A1 | 11/2009 | Otake |
| 2010/0036577 | A1 | 2/2010 | Kodama et al. |
| 2010/0138123 | A1 | 6/2010 | Tokimasa et al. |
| 2010/0187901 | A1 | 7/2010 | Sonoda et al. |

FOREIGN PATENT DOCUMENTS

| | | |
|---|---|---|
| JP | 2007-308005 A | 11/2007 |
| JP | 2008-044554 A | 2/2008 |
| JP | 2010-013036 A | 1/2010 |
| JP | 2010-132032 A | 6/2010 |

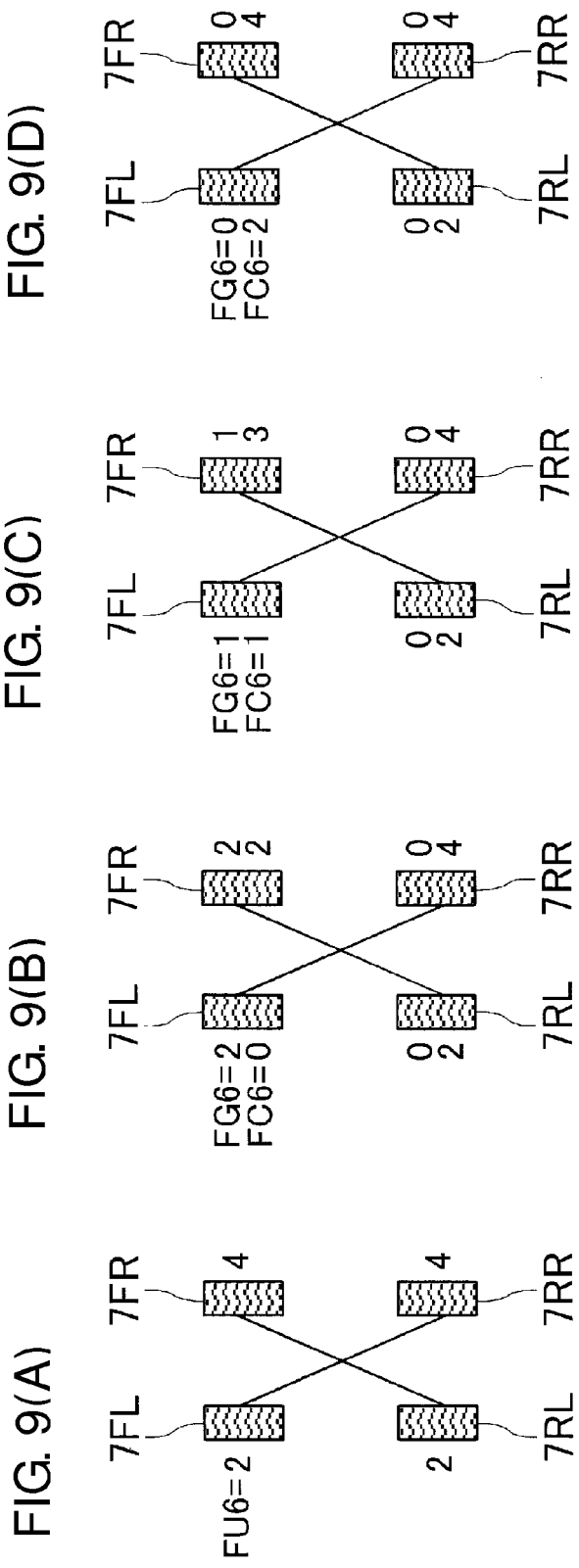

VEHICLE BRAKE SYSTEM

INCORPORATION BY REFERENCE

This application is a divisional of U.S. application Ser. No. 13/241,017 filed on Sep. 22, 2011 which is based on and claims priority under 35 U.S.C. 119 with respect to Japanese Application No. 2010-213201 filed on Sep. 24, 2010, the entire content of both of which is incorporated herein by reference.

BACKGROUND OF THE INVENTION

1. Field of the Invention

The present invention relates to a vehicle brake system provided with a hydraulic brake device and a regenerative brake device. More particularly, it relates to a brake control device for cooperatively controlling the hydraulic brake device and the regenerative brake device.

2. Discussion of the Related Art

In hybrid vehicles which are provided with an engine and a generator motor as travelling drive sources, it has become widespread to heighten the fuel efficiency by regenerating motion energy to electric energy by the generator motor and storing the electric energy at the time of a braking operation. In this sense, the generator motor is regarded as a regenerative brake device that applies the regenerative brake force to driving wheels. The regenerative brake device alone is unable to generate a sufficient brake force and thus, is usually used in combination with a conventional hydraulic brake device which operates under pressurized oil. Therefore, a cooperative control is required for the hydraulic brake device and the regenerative brake device, and there have been proposed various cooperative control technologies like that described in US 2007/0272457 A1 (equivalent of JP2007-308005 A).

A vehicle disclosed in the United State publication is provided with a combustion engine, an electric motor, battery means, fluid-operated brake means (hydraulic brake device), demand brake force setting means, and brake control means. The fluid-operated brake means is able to output a brake force based on a manipulation pressure (base hydraulic pressure), corresponding to the driver's manipulation and a negative pressure in the combustion engine, and an additional pressure (controlled hydraulic pressure) given by pressurizing means. Further, when a brake demand manipulation is performed, the brake control means executes a control to compare a sum of a regenerative brake force by the electric motor and a manipulation brake force corresponding to the manipulation pressure with a demand brake force and judges the necessity of a brake force depending on the additional pressure. The control makes it possible that even when the negative pressure in the combustion engine goes down, a demand brake force is acquired correctly by suppressing an uncomfortable feeling which is liable to be felt by the driver.

Further, although the hydraulic brake device usually operates in response to the braking manipulation by the driver and, in addition to this function, is often to have a function of automatically adjusting the brake force to be increased or reduced. Such an automatic brake control function is realized in a combination of an electronic control device, incorporating a computer and being operable by software, and sensors for acquiring various information such as braking manipulation amount, wheel speeds and the like. For example, in an active cruise control (ACC) function, a following distance (i.e., a distance to a vehicle ahead) is kept to be longer than a predetermined value by generating a brake force in dependence on the situation where a braking manipulation is not performed or the amount of the braking manipulation is insufficient though a detected following distance decreases. In a brake assist (BA) function, it is discriminated based on a braking manipulation amount and a manipulation speed whether or not a braking manipulation is an urgent braking manipulation, and an additional brake force is added to the brake force corresponding to the braking manipulation force. Further, in an antilock brake system (ABS) function, when a wheel is locked at the time of an urgent braking manipulation, the hydraulic pressure in the hydraulic brake device is automatically adjusted to regulate the brake force thereby to suppress the slipping of the wheel. Those belonging to this category are a traction control (TRC) function that controls the driving force to be effectively exerted on the road surface by adding a brake force when the slipping amounts of the driving wheel are large, and an electronic stability control (ESC) function that keeps the stability in travelling by regulating the braking amounts of respective wheels during the travelling.

In systems provided with a hydraulic brake device and a regenerative brake device as typically described in the aforementioned United State publication, when a braking manipulation is done, the regenerative brake device is additionally operated whereas, during an automatic brake control function such as the ACC function, the BA function or the like, the brake force is regulated only by the hydraulic brake device with the regenerative brake device held out of operation. That is, a stage that the regenerative brake function by a generator motor can be utilized takes place unless the driving wheels are being driven when the brake force is generated by the automatic brake control function. However, during the automatic brake control function, the regenerative brake function has heretofore not been utilized for the reason that the utilization of the regenerative brake function at that stage complicates the distribution of brake forces to respective wheels, and the like. As a result, the hydraulic brake device only has been used even at the stage that the regenerative brake device can be inherently utilized, and thus, the opportunity to enhance the efficiency in regeneration has been lost.

SUMMARY OF THE INVENTION

Accordingly, it is a primary object of the present invention to provide an improved vehicle brake system which when generating a brake force by an automatic brake control function, is able to distribute a part of the brake force to a regenerative brake device, thereby enhancing the efficiency in regeneration.

Briefly, in a first aspect of the present invention, there is provided a vehicle brake system, which comprises a hydraulic brake device having a master cylinder for generating a base hydraulic pressure corresponding to a manipulation amount of a braking manipulation member, a pump for generating a controlled hydraulic pressure, and a hydraulic control unit for adding a base hydraulic brake force corresponding to the base hydraulic pressure and a controlled hydraulic brake force corresponding to the controlled hydraulic pressure to apply the added brake forces to wheels; a regenerative brake device for applying a regenerative brake force to driving wheels which are included in the wheels and are driven by a generator motor; and a brake control device for cooperatively controlling the hydraulic brake device and the regenerative brake device. The brake control device includes a driver target brake force calculation section for calculating a driver target brake force for each wheel corresponding to the manipulation amount of the braking manipulation member; a compensation brake force setting section for enabling the brake control device to set compensation brake forces for the respective wheels independently of the driver target brake force; a selection compensation section for selecting a larger one of the driver target brake force and the compensation brake force for each wheel and for subtracting the base hydraulic brake force from the selected one brake force to set a compensated target brake force for each wheel; and a distribution control section for controlling the compensated target brake force for each wheel to be distributed to the controlled hydraulic brake force for each wheel and the regenerative brake force for each driving wheel.

With the construction in the first aspect of the present invention, the brake control device which cooperatively controls the hydraulic brake device and the regenerative brake device selects a larger one of the driver target brake force corresponding to the manipulation amount of the braking manipulation member and the compensation brake force set by the brake control device itself for each wheel, subtracts the base hydraulic brake force from the selected one brake force to set a compensated target brake force for each wheel, and distributes the compensated target brake force to the controlled hydraulic brake force for each wheel and the regenerative brake force for each driving wheel. Thus, when the compensation brake force exceeds the driver target brake force, at least a part of the brake force which part corresponds to a surplus is distributed to the regenerative brake device. This results in bringing the regenerative brake device into operation though the same has heretofore not been operated when the compensation brake forces set by the brake control device itself are generated during an active cruise control function or the like, and therefore, the efficiency in regeneration can be enhanced.

In a second aspect of the present invention, there is provided a vehicle brake system, which comprises a hydraulic brake device having a master cylinder for generating a base hydraulic pressure corresponding to a manipulation amount of a braking manipulation member, a pump for generating a controlled hydraulic pressure, and a hydraulic control unit for adding a base hydraulic brake force corresponding to the base hydraulic pressure and a controlled hydraulic brake force corresponding to the controlled hydraulic pressure to apply the added brake forces to wheels; a regenerative brake device for applying regenerative brake forces to driving wheels which are included in the wheels and are driven by a generator motor; and a brake control device for cooperatively controlling the hydraulic brake device and the regenerative brake device. The brake control device includes a driver target brake force calculation section for calculating a driver target brake force for each wheel corresponding to the manipulation amount of the braking manipulation member; a compensation brake force setting section for enabling the brake control device itself to set compensation brake forces for the respective wheels independently of the driver target brake force; an addition compensation section for adding the compensation brake force for each wheel to the driver target brake force to obtain a sum and for subtracting the base hydraulic brake force from the sum to set a compensated target brake force for each wheel; and a distribution control section for controlling the compensated target brake force for each wheel to be distributed to the controlled hydraulic brake force for each wheel and the regenerative brake force for each driving wheel.

With the construction in the second aspect of the present invention, the brake control device which cooperatively controls the hydraulic brake device and the regenerative brake device adds the driver target brake force corresponding to the manipulation amount of the braking manipulation member and the compensation brake force set by the brake control device itself for each wheel to obtain the sum, subtracts the base hydraulic brake force from the sum to set the compensated target brake force for each wheel, and distributes the compensated target brake force to the controlled hydraulic brake force for each wheel and the regenerative brake force for each driving wheel. Thus, at least a part of the compensation brake force is distributed to the regenerative brake device. This results in bringing the regenerative brake device into operation though the same has heretofore not been operated when the compensation brake forces set by the brake control device itself are generated during a brake assist function or the like, and therefore, the efficiency in regeneration can be enhanced.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 8:
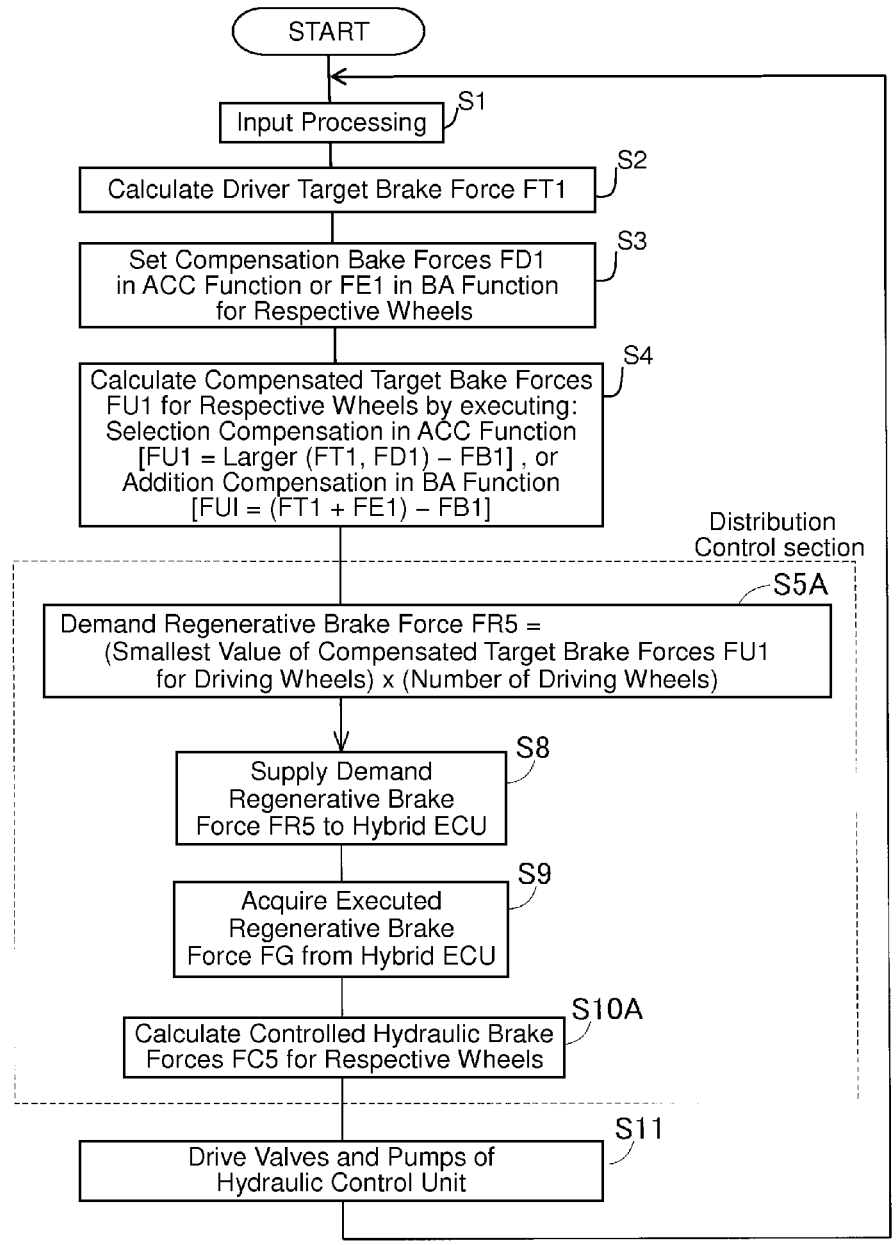

FIGS. 6(A)-6(D) are schematic diagrams for explaining specific examples of distribution controls in which a left right equal-time distribution control means or section executes the distribution of brake forces to respective wheels;

FIGS. 7(A)-7(D) are schematic diagrams for explaining specific examples of distribution controls in which a left right unequal-time distribution control means or section executes the distribution of brake forces to the respective wheels;

FIG. 8 is a flow chart showing a control processing executed by the brake ECU in a second embodiment; and FIGS. 9(A)-9(D) are explanatory views for showing specific examples of distribution controls in which brake forces are distributed to the respective wheels in the second embodiment.

DETAILED DESCRIPTION OF THE PREFERRED EMBODIMENTS

First Embodiment

Figure 1:
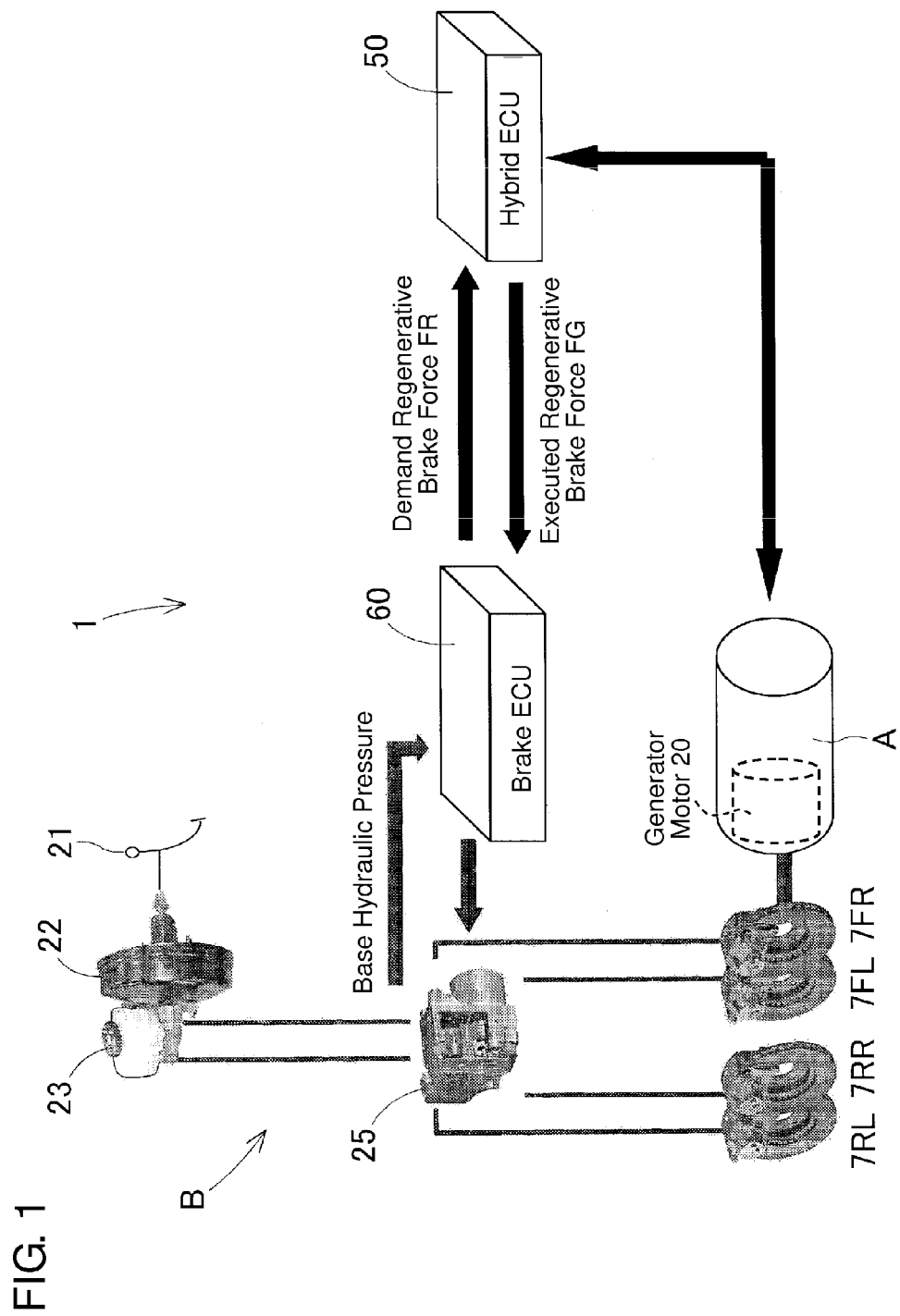
FIG. 1 is a schematic view showing the construction of a vehicle brake system in a first embodiment according to the present invention.

Hereafter, a vehicle brake system in a first embodiment according to the present invention will be described with reference to FIGS. 1-7. FIG. 1 is a schematic view showing the construction of a vehicle brake system 1 in the first embodiment according to the present invention. As shown in the figure, the vehicle brake system 1 is composed of a regenerative brake device A, a hydraulic brake device B, a hybrid ECU 50, a brake ECU 60 and the like. The vehicle brake system 1 is equipped on a front-drive, four-wheel hybrid vehicle and is usually operated in dependence on a stepping manipulation of a brake pedal 21 by the driver. In addition thereto, the system 1 has a function in which the brake ECU automatically sets and regulates a brake force for each wheel in dependence on the vehicle travelling state.

The regenerative brake device A is constituted by a generator motor 20 incorporated therein and includes an inverter device and a battery device (both not shown). The generator motor 20 operates as electric motor by being driven by the inverter device which converts a direct current voltage of the battery device into an alternating current voltage, and drives a front right wheel 7FR and a front left wheel 7FL both being driving wheels. Further, the generator motor 20 operates as generator by being driven by the front right wheel 7FR and the front left wheel 7FL and charges the battery device through the inverter device. At this time, the reaction force from the generator motor 20 applies a regenerative brake force to the front right wheel 7FR and the front left wheel 7FL, and thus, this function is generally called the regenerative brake device A. The front right wheel 7FR and the front left wheel 7FL are on a common axle connected to the generator motor 20 and thus, generate regenerative brake forces which are almost the same in strength. In a modified form, a generator and an electric motor may be individually provided in substitution for the generator motor 20, and the generator may be provided with the function of operating as the regenerative brake device A.

The hybrid ECU 50 is an electronic controller for controlling the whole of a power train for the hybrid vehicle and cooperatively controls an engine (not shown) and the generator motor 20. The hybrid ECU 50 is connected to the inverter device and controls the regenerative brake device A.

The hydraulic brake device B uses operating oil as operating fluid and as shown therein, is composed of a brake pedal 21, a vacuum brake booster 22, a master cylinder 23, a hydraulic control unit 25 and the like. In the hydraulic brake device B, the stepping force given by the stepping manipulation of the brake pedal 21 is boosted by the vacuum booster 22, a base hydraulic pressure is generated by operating the master cylinder 23, and a controlled hydraulic pressure is added to the base hydraulic pressure by operating pumps 37, 47 (FIG. 2) in the hydraulic control unit 25, so that the hydraulic pressure so added is applied to respective wheel cylinders WC2, WC3, WC4 and WC1 of the front right wheel 7FR, the front left wheel 7FL, a rear right wheel 7RR and a rear left wheel 7RL. Hereafter, the hydraulic brake device B will be described in detail with reference to FIG. 2.

Figure 2:
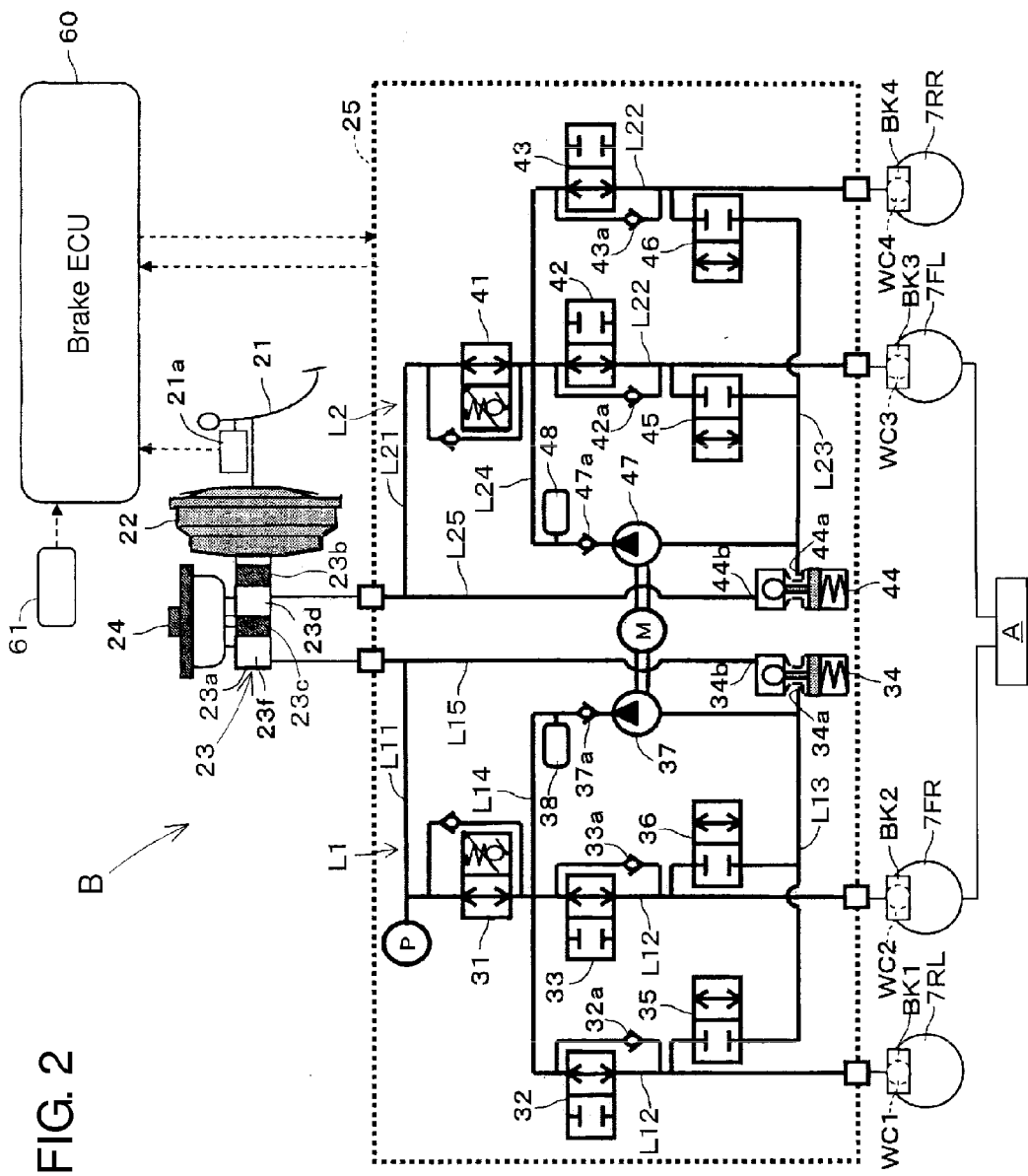
FIG. 2 is a circuit diagram showing the detailed construction of a hydraulic brake device shown in FIG. 1.

FIG. 2 is a circuit diagram showing the detailed construction of the hydraulic brake device B shown in FIG. 1. The brake pedal 21 is a member corresponding to a braking manipulation member and operates the vacuum booster 22 in correspondence to the stepping manipulation amount. A stroke amount being the manipulation amount of the brake pedal 21 is detected by a pedal stroke sensor 21a and is outputted as detection signal to the brake ECU 60. The vacuum booster 22 boosts the stepping force by the stepping manipulation of the brake pedal 21 by utilizing a negative pressure supplied from the engine (not shown) and operates the master cylinder 23.

The master cylinder 23 is of a tandem type and is constituted by a housing 23a taking the shape of a bottomed cylinder and first and second pistons 23b, 23c arranged in line in the housing 23a to be fluid-tightly and slidably. A first hydraulic chamber 23d is formed between the first piston 23b and the second piston 23c, while a second hydraulic chamber 23f is formed between the second piston 23c and a bottom portion of the housing 23a. The first and second pistons 23b, 23c are driven by the vacuum brake booster 22 to generate a base hydraulic pressure in the first and second hydraulic chambers 23d, 23f. Further, a reservoir 24 has a function of regulating the quantities of the operating oil in the first and second hydraulic chambers 23d, 23f by communicating with the same when the first and second pistons 23b, 23c are not being operated.

The hydraulic control unit 25 is constructed by packaging into a single case hydraulic control valves 31, 41; pressure increase control valves 32, 33, 42, 43 and pressure reducing control valves 35, 36, 45, 46 which constitutes ABS control valves; pressure regulating reservoirs 34, 44; pumps 37, 47; and a motor M. As shown in FIG. 2, the brake piping passage of the hydraulic brake device B in the present embodiment is configured to take an X-piping fashion which has a first piping passage L1 for applying a hydraulic brake force to the front right wheel 7FR and the rear left wheel 7RL and a second piping passage L2 for applying the hydraulic brake force to the front left wheel 7FL and the rear right wheel 7RR. The master cylinder 23 is connected to the second pipe passage L2 at the first hydraulic chamber 23d and to the first piping passage L1 at the second hydraulic chamber 23f.

First of all, description will be made regarding the construction of the first piping passage L1 of the hydraulic control unit 25. The first piping passage L1 is provided thereon with the hydraulic control valve 31 constituted by a differential pressure control valve. The hydraulic control valve 31 is switchable into a communication state and a differential pressure state in response to a command from the brake ECU 60. The hydraulic control valve 31 is usually held in the communication state, but by being switched into the differential pressure state, is able to maintain an oil passage L12 on the wheel cylinder WC1, WC2 sides at a pressure which is higher by a predetermined differential pressure than the base hydraulic pressure of an oil passage L11 on the master cylinder 23 side. This differential pressure is a controlled hydraulic pressure and can be generated from a discharge pressure of the pump 37, as referred to later.

The oil passage L12 branches into two, and one branched is provided thereon with the pressure increase valve 32 for controlling the pressure increase of the brake hydraulic pressure to the wheel cylinder WC1 for the rear left wheel 7RL. The other branched is provided thereon with the pressure increase valve 33 for controlling the pressure increase of the brake hydraulic pressure to the wheel cylinder WC2 for the front right wheel 7FR. Each of the pressure increase valves 32, 33 is configured as a two-position valve which is controllable by the brake ECU 60 to be switched into a communication state and a blocked state. Thus, when the pressure increase control valves 32, 33 is held in the communication state, each of the wheel cylinders WC1, WC2 can be supplied with either the base hydraulic pressure of the master cylinder 23 or a hydraulic pressure which is made by adding a controlled hydraulic pressure built by the operation of the pump 37 to the base hydraulic pressure.

Further, the oil passages L12 between the pressure increase control valves 32, 33 and the respective wheel cylinders WC1, WC2 are in communication with a reservoir hole 34a of the pressure regulation reservoir 34 through respective oil passages L13. The oil passages L13 respectively have the pressure reducing valves 35, 36 arranged thereon, each of which is controllable by the brake ECU 60 to be switched into a communication state and a blocked state.

In a usual operation state that the ABS function is not being executed, the pressure increase control valves 32, 33 remain in the communication state, while the pressure reducing control valves 35, 36 remain in the blocked state. With the execution of the ABS control, a pressure reducing mode is executed to close the pressure increase control valves 32, 33 and to open the pressure reducing control valves 35, 36. Thus, the operating oil is discharged to the pressure regulation reservoir 34 through the oil passages L13, and the hydraulic pressure in the wheel cylinders WC1, WC2 are reduced to prevent the front right wheel 7FR and the rear left wheel 7RL from becoming a tendency to be locked. In a pressure increase mode at the time of the ABS function, the pressure increase control valves 32, 33 are opened, while the the pressure reducing control valves 35, 36 are closed. Thus, the hydraulic pressure in the wheel cylinders WC1, WC2 is increased to increase the brake forces of the front right wheel 7FR and the rear left wheel 7RL. The pressure increase control valves 32, 33 are provided with respective safety valves (one-way valves) 32a, 33a in parallel thereto. The safety valves 32a, 33a operate to return the operating fluids in the wheel cylinders WC1, WC2 to the reservoir 24 when the brake pedal 21 is not stepped further during the ABS function.

Further, the pump 37 together with a safety valve 37a is arranged on an oil passage L14 which connects the reservoir hole 34a of the pressure regulation reservoir 34 to the oil passages L12 extending between the hydraulic control valve 31 and the pressure increase control valves 32, 33. A damper 38 arranged on the discharge side of the pump 37 absorbs the pulsation in pressure in the discharged operating oil to urge the same to be supplied to the oil passages L12 without such pressure pulsation. The suction side of the pump 37 is connected to the reservoir hole 34a of the pressure regulation reservoir 34. Further, an oil passage L15 is provided which makes another reservoir hole 34b of the pressure regulation reservoir 34 communicate with the oil passage L11, so that the pressure regulation reservoir 34 is in communication with the master cylinder 23.

The pump 37 is able to adjust its discharge flow volume since the drive current to the motor M is regulated by a command from the brake ECU 60. The pump 37 operates at the time of the pressure reducing mode in the ABS control and draws the operating oils in the wheel cylinders WC1, WC2 or the operating oil in the pressure regulation reservoir 34 to return the drawn operating oil to the master cylinder 23 through the hydraulic control valve 31 held in the communication state. Further, the pump 37 operates to generate a controlled hydraulic pressure in performing the functions that control the vehicle to be stable in posture, such as the traction control function, the electronic stability control function and the like, in addition to the active cruise control function and the brake assist function.

That is, in order to generate a differential pressure across the hydraulic control valve 31 having been switched to the differential pressure state, the pump 37 draws the operating fluid in the master cylinder 23 through the oil passage L11 and the oil passage L15 and discharges the drawn operating fluid to each of the wheel cylinders WC1, WC2 through the oil passages L14, L12 and further through the pressure increase valves 32, 33 held in the communication state to apply a controlled hydraulic pressure thereto. Further, also in the case that a sufficient regenerative brake force cannot be performed by the regenerative brake device A, and the like, the pump 37 is operated to generate a differential pressure and applies a controlled hydraulic pressure to each of the wheel cylinders WC1, WC2.

Further, the oil passage L11 is provided thereon with a pressure sensor P for detecting the base hydraulic pressure generated by the master cylinder 23, and the detected signal is transmitted to the brake ECU 60. The positions of the first and second pistons 23b, 23c in the master cylinder 23 are grasped from the base hydraulic pressure detected by the pressure sensor P, and this makes it possible to know the manipulation amount of the brake pedal 21. The pressure sensor P may be provided on the oil passage L21 of the second piping passage L2.

Further, the second piping passage L2 in the hydraulic control unit 25 takes the same construction as the aforementioned first piping passage L1 and is composed of oil passages L21-L25. The same is true with valves and the like, and the second piping passage L2 is provided thereon with the hydraulic control valve 41 and the pressure regulation reservoir 44. One of branching oil passages L22 is provided thereon with the pressure increase control valve 42 for controlling the pressure increase of the brake fluid in the wheel cylinder WC3 of the front left wheel 7FL, while the other of the branching oil passages L22 is provided thereon with the pressure increase control valve 43 for controlling the pressure increase of the brake fluid in the wheel cylinder WC4 of the rear right wheel 7RR. Further, the pressure reducing control valves 45, 46 are provided on oil passages L23 respectively branching from the oil passages 22, and the pump 47 is provided on an oil passage L24.

The hydraulic control unit 25 is able to apply the base hydraulic pressure from the master cylinder 23 and the controlled hydraulic pressure which is built by driving the pumps 37, 47 and by controlling the hydraulic control valves 31, 41, to the wheel cylinders WC1-WC4 of the respective wheels 7RL, 7FR, 7FL, 7RR. When supplied with the base hydraulic pressure and the controlled hydraulic pressure, the respective wheel cylinders WC1-WC4 operate brake means BK1-BK4 to apply a base hydraulic brake force FB and a controlled hydraulic brake force FC to each of the wheels 7RL, 7FR, 7FL, 7RR. As the brake means BK1-BK4, there are used disc brakes, drum brakes or the like, in which friction members like the brake pads, brake shoes or the like restrict rotations of disc rotors, brake drums or the like which are bodily provided on the wheels.

The brake ECU 60 is an electronic controller for controlling the whole of the vehicle brake system 1 in cooperation with the hybrid ECU 50. The brake ECU 60 controls the openings/closings of the valves and the like in the hydraulic control unit 25 and also controls the driving of the motor M to control the pumps 37, 47. Further, the brake ECU 60 is connected to receive detection signals from the pedal stroke sensor 21a and the pressure sensor P. Further, the brake ECU 60 is connected to receive a detection signal form a following distance sensor (vehicle-to-vehicle sensor) 61. The following distance sensor 61 is a sensor which uses a laser beam to detect the following distance to a vehicle traveling ahead, and the detection signal of the following distance is used in executing the active cruise control function.

The brake ECU 60 calculates a driver target brake force FT corresponding to the manipulation amount of the brake pedal 21, subtracts a base hydraulic brake force FB therefrom and distributes the remainder for use as a controlled hydraulic brake force FC and a regenerative brake force (executed regenerative brake force FG). At this time, the brake ECU 60 supplies the hybrid ECU 50 with a command indicating the strength of a demand regenerative brake force FR being a target of the regenerative brake force. The hybrid ECU 50 controls the regenerative brake device A in response to the command and feeds back an actually generated regenerative brake force, that is, an executed regenerative brake force FG. Upon receiving the executed regenerative brake force FG, the brake ECU 60 finally controls the distribution of the controlled hydraulic brake force FC to each wheel. The hybrid ECU 50 and the brake ECU 60 cooperatively control the hydraulic brake device B and the regenerative brake device A and correspond to the brake control device in the claimed invention.

Further, the brake ECU 60 has a function of automatically setting compensation brake forces FD for the respective wheels by itself in dependence on the vehicle travelling situation and controlling the distribution thereof, as exemplified hereinafter. For example, in the active cruise control function, when the detected following distance decreases, the brake ECU 60 sets the compensation brake forces FD to keep the following distance longer than a predetermined value. When each compensation brake force FD exceeds the driver target brake force FT, the brake ECU 60 executes a control to automatically compensate the difference. Further, in the brake assist function, when recognizing an emergency braking manipulation from the braking manipulation amount and the manipulation speed, the brake ECU 60 sets another compensation brake force FE which should be added to the driver target brake force FT. The brake ECU 60 automatically executes a control to generate a brake force on which the compensation brake force FE is added to the driver target brake force FT.

Heretofore, the brake force being a surplus over the driver target brake force FT has been realized as a result that the brake ECU 60 drives the pumps 37, 47 of the hydraulic control unit 25 to increase the controlled hydraulic pressure and hence, to increase the controlled hydraulic brake force FC. The present embodiment is designed to make the regenerative brake device A generate at least a part of the brake force being the surplus over the driver target brake force FT.

Figure 3:
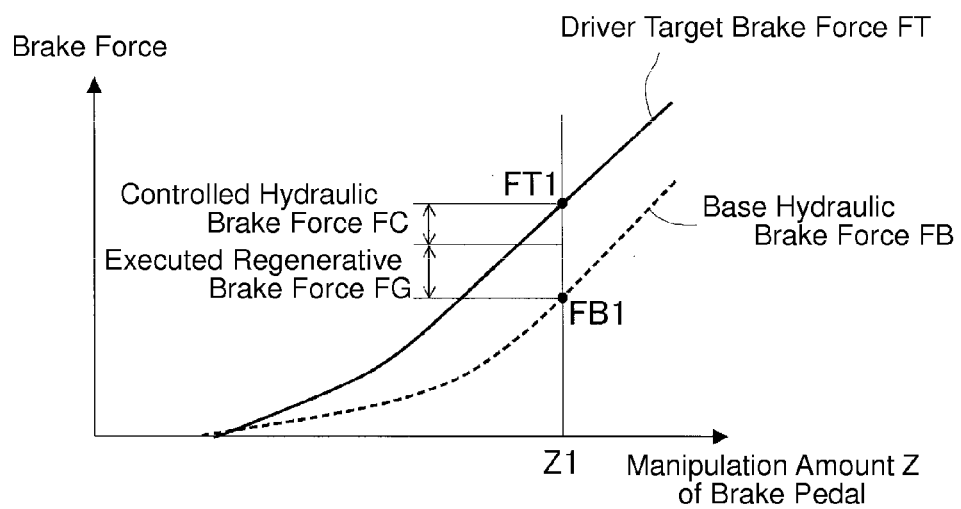
FIG. 3 is a graph showing the operation property at an ordinary time of the vehicle brake system.

FIG. 3 is a graph showing the operation property of the vehicle brake system 1 at an ordinary time. In FIG. 3, the axis of abscissas indicates the manipulation amount of the brake pedal, while the axis of ordinates indicates brake force. The solid line curve in the figure represents the driver target brake force FT corresponding to the manipulation amount of the brake pedal 21, and the broken line curve represents the base hydraulic brake force FB which corresponds to a base hydraulic pressure the master cylinder 23 generates in correspondence to the manipulation amount of the brake pedal 21. The difference calculated by subtracting the base hydraulic brake force FB from the driver target brake force FT is distributed to the regenerative brake force (executed regenerative brake force FG) by the regenerative brake device A and the controlled hydraulic brake force FC by the pump driving, so that the driver target brake force FT is controlled to be generated as calculated. The operation property in FIG. 3 is stored in the brake ECU 60 in advance as a map in the form of a table or as relational expressions and is used as occasion arises.

It is to be noted that each of the brake forces is expressed by two-uppercase symbols and will hereafter be referred to as that to which a numeral is suffixed appropriately. The numeral suffixed is for the purpose of easing the reference to each of particular values of the brake forces exemplified in the drawings, and the same uppercase symbols represent brake forces of the same kind even if they have different numerals suffixed.

Figure 4:
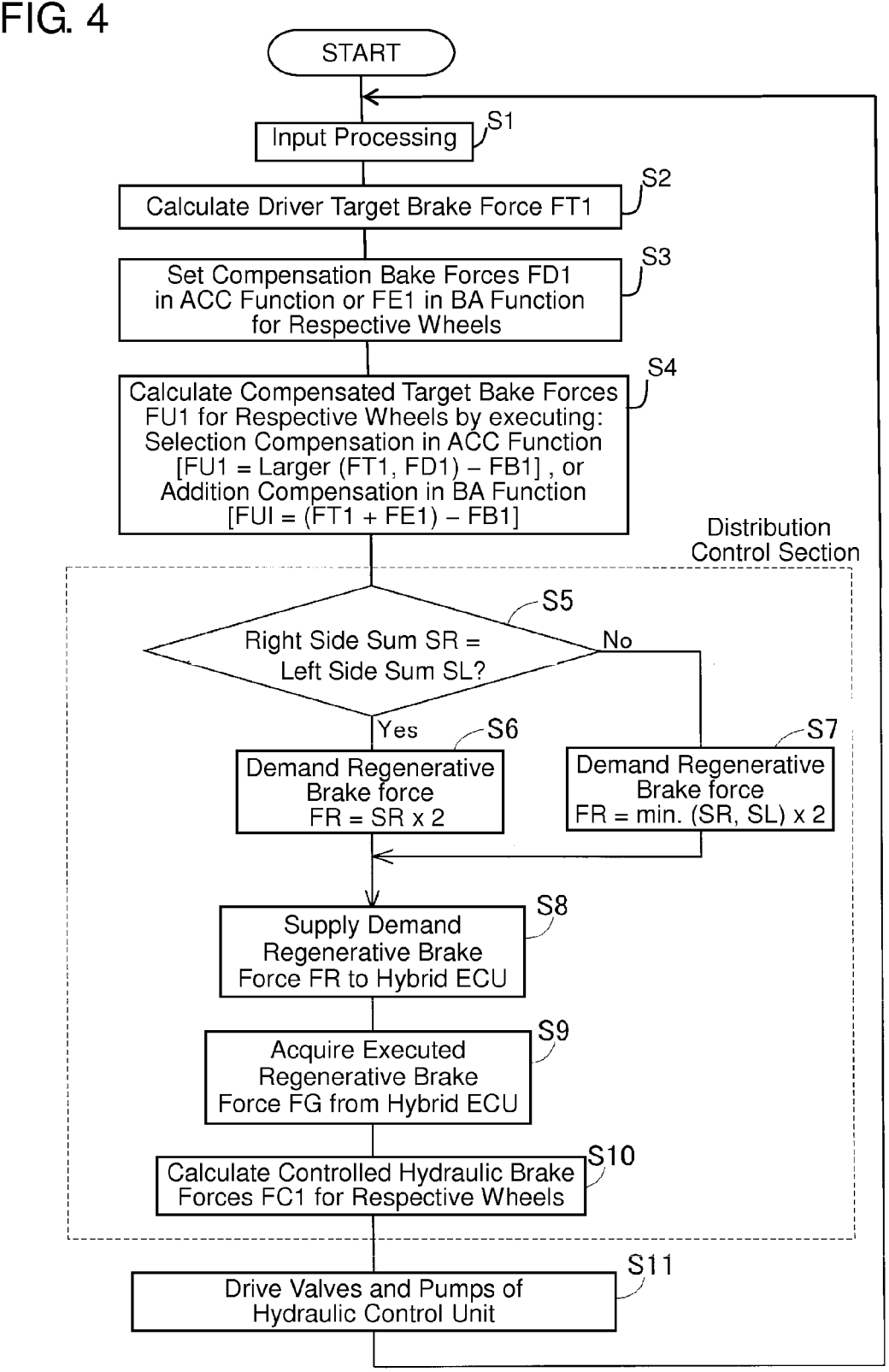
FIG. 4 is a flow chart showing a control processing executed by a brake ECU in the first embodiment.

Next, description will be made regarding the control operation of the brake ECU 60 in the first embodiment. FIG. 4 is a flow chart showing the control processing of the brake ECU 60 in the first embodiment, and the control processing will be referred to as the case that the active cruise control function has been in operation. As illustrated, the brake ECU 60 performs an input processing at step S1. Specifically, the brake ECU 60 reads detection signals of the pedal stroke sensor 21a, the pressure sensor P and the following distance sensor 61 and exchanges information with the hybrid ECU 50.

At step S2, the brake ECU 60 obtains a manipulation amount Z1 of the brake pedal 21 based on the detection signals of the pedal stroke sensor 21a and the pressure sensor P and calculates a driver target brake amount FT1 corresponding to the manipulation amount Z1 from the operation property in FIG. 3. Although the detection signals of both of the pedal stroke sensor 21a and the pressure sensor P are used in order to make the detected manipulation amount Z1 enhanced in accuracy, the detection signal of either one of the sensors may be used. The driver target brake amount FT1 is usually the amount which is calculated taking the whole vehicle into consideration. However, in the illustrated control processing flow chart, the amount FT1 is considered as the amount per wheel which is obtained by dividing that for the whole vehicle by the number of the wheels. Step 2 corresponds to the driver target brake force calculation means or section in the claimed invention.

Step S3 is executed to calculate compensation brake forces FD1 for the respective wheels 7FR, 7FL, 7RR, 7RL. In the active cruise control (ACC) function, a setting is made for compensation brake forces FD1 that become necessary in dependence on the following distance detected by the following distance sensor 61. Different compensation brake forces FD1 may be set for the respective wheels. Step 3 corresponds to the compensation brake force setting means or section in the claimed invention.

Step 4 is executed to calculate compensated target brake forces FU1 for the respective wheels 7FR, 7FL, 7RR, 7RL. In the active cruise control function, a larger one is selected from the driver target brake force FT1 and each compensation brake force FD1, and the base hydraulic brake force FB1 obtained from FIG. 3 is subtracted from the selected one force to obtain the compensated target brake force FU1 for each wheel. The compensated target brake force FU1 is the brake force which should be undertaken by the executed regenerative brake force FG and the controlled hydraulic brake force FC. Step 4 corresponds to the selection compensation means or section in the claimed invention.

At step S5, the right side sum SR obtained by adding the compensated target brake forces FU1 for the front and rear right wheels is compared with the left side sum SL obtained by adding the compensated target brake forces FU1 for the front and rear left wheels. Step S5 corresponds to the left right comparison means or section in the claimed invention.

Step 6 is reached when the both of the sums SR, SL are equal, and the double of the right side sum SR is set as a demand regenerative brake force FR. Thus, the demand regenerative brake force FR coincides with the sum of the compensated target brake forces FU1 for the four wheels. If there is a difference between the both of the sums SR, SL at step S5, step S7 is reached, wherein a smaller one of the right side sum SR and the left side sum SL is doubled to be set as the demand regenerative brake force FR. Steps S6 and S7 merge at step S8 to deliver the demand regenerative brake force FR to the hybrid ECU 50, that is, to command the generator motor 20 to generate the demand regenerative brake force FR. The generator motor 20 generates as much regenerative brake force as possible within the demand regenerative brake force FR, and the hybrid ECU 50 transmits the executed regenerative brake force FG back to the brake ECU 60.

At step S9, the brake ECU 60 acquires the executed regenerative brake force FG which was exerted by the generator motor 20, from the hybrid ECU 50. At next step S10, the value made by dividing the executed regenerative brake force FG by four (4) is subtracted from the respective compensated target brake forces FU1 for the four wheels to set respective controlled hydraulic brake forces FC1 for the four wheels. Steps S5-S10 correspond to the distribution control means or section in the claimed invention. Further, step S6 and steps S8-S10 correspond to the left right equal-time distribution control means or section in the claimed invention, and steps S7-S10 correspond to the left right unequal-time distribution control means or section in the claimed invention.

At final step S11, in order to realize the respective controlled hydraulic brake forces FC1 on the four wheels, the brake ECU 60 controls solenoids of the respective valves in the hydraulic control nit 25 and also controls the motor M to drive the pumps 37, 47. Thus, one cycle of the control processing is completed, and return is made to step S1 to repetitively execute the control processing thereafter.

In the case that the brake assist (BA) function operates, the processing at step S3 and S4 are changed from those aforementioned. That is, at step S3, an emergency braking manipulation is recognized from the manipulation amount P1 of the brake pedal and the manipulation speed being the time-dependant change rate, and a compensation brake force FE1 to be added to the driver target brake force FT1 is set. At step S4, the compensation brake force FE1 is added to the driver target brake force FT1, and the base hydraulic brake force FB1 is subtracted from the sum of the addition to set the compensated target brake force FU1 for each wheel. In this case, step S4 corresponds to the addition compensation means or section in the claimed invention.

Figure 5:
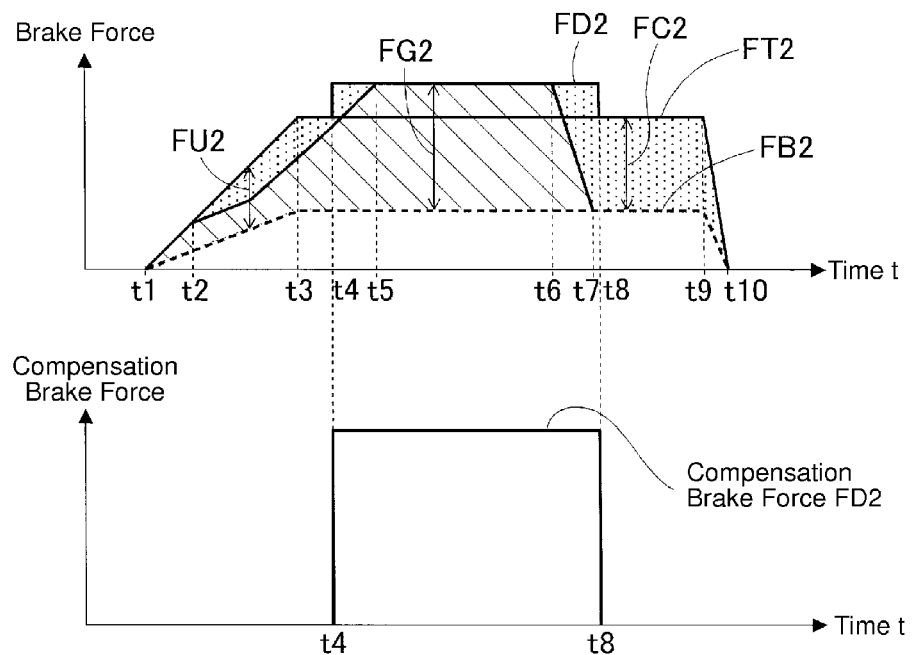
FIG. 5 is a combination of graphs schematically exemplifying the result that the brake ECU attains in the control processing shown in FIG. 4 during the operation of an active cruise control function.
Figure 6:
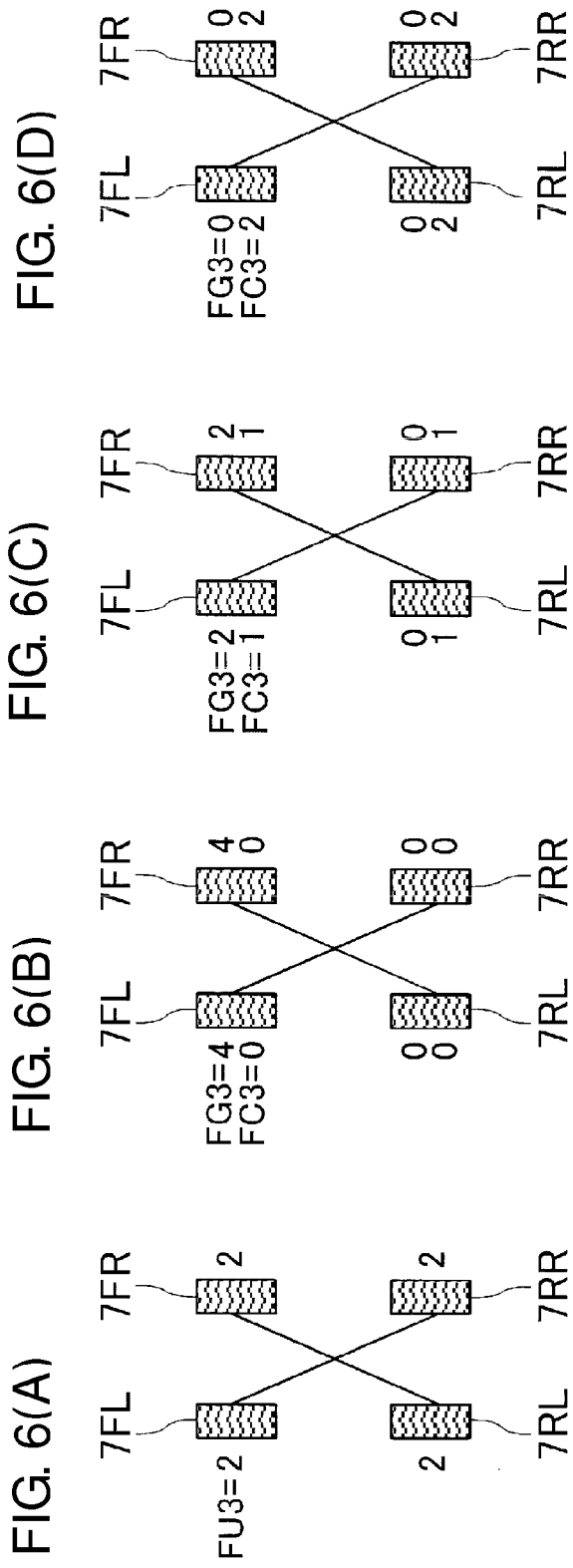
Figure 7:
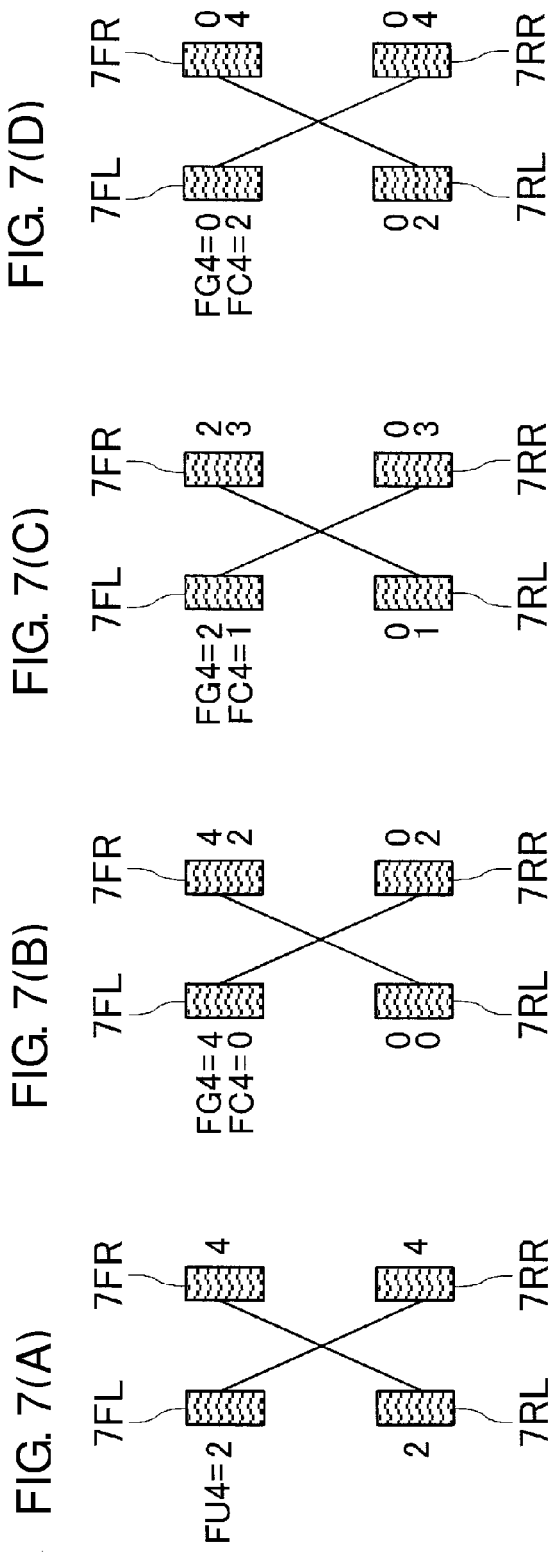

Next, description will be made regarding the operation and effects of the vehicle brake system 1 in the first embodiment constructed hereinabove. FIG. 5 is a combination of graphs schematically exemplifying the result that the brake ECU executed the control processing shown in FIG. 4 during the operation of the active cruise control function. The upper graph in the figure exemplifies the distribution of the brake forces to the front right wheel 7FR, while the lower graph represents the compensation brake force FD2 set in the active cruise control function. The axis of abscissas in the graphs is a common time axis (t).

FIG. 5 exemplifies the case wherein the stepping of the brake pedal 21 begins at time t1, the manipulation amount Z of the pedal 21 is gradually increased until time t3, the manipulation amount Z is kept almost fixed from time t3 to time t9, the manipulation amount Z is returned to zero from time t9 to time t10, and the compensation brake force FD2 is set during the period from time t4 to time t8. The driver target brake force FT2 which varies in correspondence to the manipulation amount Z of the brake pedal 21 is changed to represent a trapezoidal form, as indicated by the solid line. Further, the base hydraulic brake force FB2 which varies in correspondence to the manipulation amount Z of the brake pedal 21 is changed to represent a trapezoidal form lower in height than that of the driver target brake force FT2, as indicated by the broken line.

In this case, during each period of the time t1-t4 and time time t8-t10 with the compensation brake force FD2 being not set, the compensated target brake force FU2 is calculated by subtracting the base hydraulic brake force FB2 from the driver target brake force FT2. Further, during the period of time t4-t8 with the compensation brake force FD2 being set to be larger than the driver target brake force FT2, the compensated target brake force FU2 is calculated by subtracting the base hydraulic brake force FB2 from the compensation brake force FD2. In the upper graph, the range indicated by a declining hatching is undertaken by the executed regenerative brake force FG2, and the range indicated by dots is undertaken by the controlled hydraulic brake force FC2.

As illustrated, the base hydraulic brake force FB2 is generated at the same time as the driver target brake force FT2 is generated at time t1, and the compensated target brake force FU2 is undertaken by the executed regenerative brake force FG2. When at time t2, the increase of the executed regenerative brake force FG2 becomes gentle and unable to follow the compensated target brake force FU2, the controlled hydraulic brake force FC2 is generated, in which state time t4 is reached. The both of the executed regenerative brake force FG2 and the controlled hydraulic brake force FC2 are being generated at time t4, and when the active cruise control function is brought into operation at this time to cause the compensated target brake force FU2 to increase abruptly, the increment is undertaken by the controlled hydraulic brake force FC2. After the time t4, the controlled hydraulic brake force FC2 is replaced by the executed regenerative brake force FG2 which is increased gradually thereafter, and during the period of time t5-t6, the whole of the compensated target brake force FU2 is undertaken by the executed regenerative brake force FG2. As the executed regenerative brake force FG2 decreases after time t6, a part of the compensated target brake force FU2 is undertaken again by the controlled hydraulic brake force FC2. Further, when the executed regenerative brake force FG2 becomes zero at time t7, the whole of the compensated target brake force FU2 is undertaken by the controlled hydraulic brake force FC2, and this state continues unit time t10.

In the present embodiment, when the compensation brake force FD2 exceeding the driver target brake force FT2 is set by the active cruise control function, the regenerative brake device A can be used to cover or undertake the range which exceeds the driver target brake force FT2. Heretofore, the hydraulic brake device B has exclusively been used to cover the range exceeding the driver target brake force FT2. In this sense, according to the present embodiment, the efficiency in regeneration can be improved than that in the prior art.

Also in the case of adding a compensation brake force to the driver target brake force FT2 in the brake assist function, the present embodiment operates likewise as described above. Further, without being limited to the active cruise control function and the brake assist function, the present embodiment operates likewise as described above in the case where the brake ECU 60 automatically sets a brake force for each wheel exceeding the driver target brake force FT2.

Next, description will be made regarding a specific method of controlling the distribution of brake forces to the respective wheels 7FR, 7FL, 7RR, 7RL. FIGS. 6(A)-6(D) are schematic diagrams for explaining specific examples of distribution controls in which the left right equal-time distribution control means or section (step S6 and steps S8-S10 in FIG. 4) executes the distribution of brake forces to the respective wheels 7FR, 7FL, 7RR, 7RL. FIG. 6(A) indicates the compensated target brake forces FU3 for the respective wheels 7FR, 7FL, 7RR, 7RL, and each of FIGS. 6(B)-6(D) indicates the executed regenerative brake forces FG3 (numerical value at the upper row by each wheel) and the controlled hydraulic brake forces FC3 (numerical value at the lower row by each wheel) which were distributed to the respective wheels.

In the example shown in FIG. 6(A), the compensated target brake forces FU3 of the respective wheels 7FR, 7FL, 7RR, 7RL are all 2 units. Thus, each of the right side sum SR3 and the left side sum SL3 is 4 units, and the left right equal-time distribution control means or section is used. The demand regenerative brake force FR3 becomes 8 units which is calculated by doubling the right side sum SR3 of 4 units. At this time, where the operation condition of the regeneration brake device A is in satisfaction, the executed regenerative brake force FG3 of 8 units which meets the demand regenerative brake force FR3 are exerted as the total on the front right wheel 7FR and the front left wheel 7FL, as shown in FIG. 6(B). Accordingly, the controlled hydraulic brake force FC3 becomes unnecessary.

Further, where the operation condition of the regeneration brake device A is mean or moderate, as shown in FIG. 6(C), the regenerative brake force of 2 units can be exerted at each of the front right wheel 7FR and the front left wheel 7FL, so that the executed regenerative brake force FG3 becomes 4 units. Accordingly, 1 unit which is obtained by dividing the 4 units of the executed regenerative brake force FG3 by 4 is subtracted from the 2 units of the compensated target brake force FU3 for each wheel, so that 1 unit is set as the controlled hydraulic brake force FC3 for each wheel 7FR, 7FL, 7RR, 7RL. Further, where the operation condition of the regeneration brake device A is insufficient, the executed regenerative brake force FG3 becomes zero, as shown in FIG. 6(D). Therefore, the controlled hydraulic brake force FC3 for each wheel 7FR, 7FL, 7RR, 7RL becomes 2 units as a result of the compensated target brake force FU3 remaining as it is without being undertaken by the executed regenerative brake force FG3.

FIGS. 7(A)-7(D) are schematic diagrams for explaining specific examples of distribution controls in which the left right unequal-time distribution control means or section (steps S7-S10 in FIG. 4) executes the distribution of brake forces to the respective wheels 7FR, 7FL, 7RR, 7RL. FIG. 7(A) indicates the compensated target brake forces FU4 for the respective wheels 7FR, 7FL, 7RR, 7RL, and each of FIGS. 7(B)-7(C) indicates the executed regenerative brake forces FG4 (numerical value at the upper row by each wheel) and the controlled hydraulic brake forces FC4 (numerical value at the lower row by each wheel) which were distributed to the respective wheels.

In the example shown in FIG. 7(A), the compensated target brake forces FU4 for the front right wheel 7FR and the rear right wheel 7RR are each 4 units, and the compensated target brake forces FU4 for the front left wheel 7FL and the rear left wheel 7RL are each 2 units. Thus, the right side sum SR4 becomes 8 units, and the left side sum SL4 becomes 4 units, in which case the left right unequal-time distribution control means or section is used. The executed regenerative brake force FR4 becomes 8 units which is calculated by doubling the 4 units of the left side sum SL4 being the sum on the smaller side. At this time, where the operation condition of the regenerative brake device A is in satisfaction, as shown in FIG. 7(B), the executed regenerative brake force FG4 of 8 units which meets the demand regenerative brake force FR4 can be exerted as the total on the front right wheel 7FR and the front left wheel 7FL. Then, 2 units obtained by dividing the 8 unit of the executed regenerative brake force by 4 is subtracted from each of the compensated target brake forces FU4 for respective wheels to obtain controlled hydraulic brake forces FC4 for the respective wheels. Accordingly, as the controlled hydraulic brake forces FC4, 2 units is set for each of the front right wheel 7FR and the rear right wheel 7RR, zero is set for each of the front left wheel 7FL and the rear left wheel 7RL.

Further, where the operation condition of the regeneration brake device A is mean or moderate, as shown in FIG. 7(C), the regeneration brake force of 2 units can be exerted at each of the front right wheel 7FR and the front left wheel 7FL, so that the executed regenerative brake force FG4 becomes 4 units. Then, 1 unit obtained by dividing the 4 units of the executed regenerative brake force FG4 by 4 is subtracted from the compensated target brake force FU4 for each wheel, so that the controlled hydraulic brake force FC4 becomes 3 units for each of the front right wheel 7FR and the rear right wheel 7RR and 1 unit for each of the front left wheel 7FL and the rear left wheel 7RL. Further, where the operation condition of the regeneration brake device A is insufficient, the executed regenerative brake force FG4 becomes zero, as shown in FIG. 7(D). Therefore, the controlled hydraulic brake force FC4 for each wheel 7FR, 7FL, 7RR, 7RL becomes the compensated target brake force FU4 for each wheel remaining as it is without being covered by the executed regenerative brake force FG4.

As means for applying different controlled hydraulic pressures to the wheel cylinders which are connected to the same piping passage in the hydraulic control unit 25, the brake ECU 60 cyclically controls those selected from the valves in the hydraulic control unit 25 to be opened and closed cyclically. For example, with respect to the cylinders 7FR, 7RL connected to the first piping passage L1, the following control is executed to lower the controlled hydraulic pressure in the wheel cylinder WC2 for the front right wheel 7FR than that in the wheel cylinder WC1 for the rear left wheel 7RL. The pump 37 is driven, the hydraulic control valve 31 is brought into the different pressure state, the pressure increase valve 32 on the wheel cylinder WC1 side is opened, and the pressure reducing control valve 35 is closed. Thus, the full pressure of the controlled hydraulic pressure built by the pump 37 is applied to the wheel cylinder WC1. In this state, the pressure increase valve 33 and the pressure reducing valve 36 on the wheel cylinder WC2 side are controlled to be opened and closed cyclically. Thus, the operating oil flowing from the pressure increase valve 33 to the wheel cylinder WC2 is decreased in comparison with the operating oil flowing to the wheel cylinder side WC1, and at the same time, the operating oil outflows from the wheel cylinder WC2 to the pressure reducing valve 36. As a result, the controlled hydraulic pressure in the wheel cylinder WC2 is controlled to be lower than that in the wheel cylinder WC1. Further, by making the pressure increase valve 33 and the pressure reducing valve 36 changed in the rate of the opening period to the closing period, it is possible to variably adjust the controlled hydraulic pressure in the wheel cylinder WC2 with the wheel cylinder WC1 keeping the controlled hydraulic pressure fixed.

In the first embodiment, as exemplified in FIGS. 6(A)-6(D) and 7(A)-7(D), it can be realized to supply the generator motor 20 with the maximum executed regenerative brake force FR3, FR4 satisfying the condition that, where the wheels are divided into those on the right side and those on the left side, does not provide an excess brake force on the wheels on either side. Further, it can be realized to adjust the distribution of the brake forces to the front wheels and the rear wheels, in other words, to the driving wheels and the driven wheels in dependence on the strength of the executed regenerative brake force FR3, FR4 by the regenerative brake device A. Accordingly, it can be realized to generate the executed regenerative brake force FR3, FR4 which is the maximum as far as the right side sum SR3, SR4 and the left side sum SL3, SL4 are not changed, so that the efficiency in regeneration can remarkably be enhanced.

Second Embodiment

Next, description will be made regarding a vehicle brake system in a second embodiment which differs from the first embodiment in the calculation method for the demand regenerative brake force FR. The vehicle brake system in the second embodiment takes the same apparatus construction as that of the first embodiment shown in FIGS. 1 and 2, but differs therefrom in a control processing shown in FIG. 8. FIG. 8 is a flow chart showing the control processing executed by the brake ECU 60 in the second embodiment. In the second embodiment, step S5A in FIG. 8 replaces steps S5-S7 in FIG. 4, and step S10A in FIG. 8 differs from step S10 in details of calculation.

At step S5A in FIG. 8, the brake ECU 60 calculates a demand regenerative brake force FR5 by multiplying the smallest value of the compensated target brake forces FU1 for the driving wheels (the front right wheel 7FR and the front left wheel 7FL) by the number of the driving wheels. Further, at step S10A, the brake ECU 60 calculates respective controlled hydraulic brake forces FC5 by subtracting the executed regenerative brake force FG5 from each of the compensated target brake forces FU1 for the wheels 7RL, 7FR, 7FL, 7RR. This calculation is required for substantially the driving wheels only. Step S5A and step 8 in FIG. 8 correspond to the regeneration demand means or section in the claimed invention, step 9 corresponds to the regeneration acquire means or section in the claimed invention, and step 10A corresponds to the regeneration reflecting means or section in the claimed invention.

FIGS. 9(A)-9(D) are explanatory views for showing specific examples of distribution controls in which brake forces are distributed to the respective wheels 7FR, 7FL, 7RR, 7RL in the second embodiment. FIG. 9(A) indicates the compensated target brake forces FU6 for the respective wheels 7FR, 7FL, 7RR, 7RL, and each of FIGS. 9(B)-9(D) indicates the executed regenerative brake forces FG6 (numerical value at the upper row by each wheel) and the controlled hydraulic brake forces FC6 (numerical value at the lower row by each wheel) which were distributed to the respective wheels. In the example shown in FIG. 9(A), the compensated target brake forces FU6 for the front right wheel 7FR and the rear right wheel 7RR are each 4 units, and the compensated target brake forces FU6 for the front left wheel 7FL and the rear left wheel 7RL are each 2 units. Thus, the smallest value of the compensated target brake forces FU6 for the driving wheels is 2 units, and since the driving wheels are two, the demand regenerative brake force FR5 becomes 4 units.

At this time, where the operation condition for the regenerative brake device A is in satisfaction, as shown in FIG. 9(B), the executed regenerative brake force FG6 of 4 units which meet the demand regenerative brake force FR5 can be exerted as the total on the front right wheel 7FR and the front left wheel 7FL. Then, with respect to the front right wheel 7FR and the front left wheel 7FL, the respective executed regenerative brake forces FG6 are subtracted from the respective compensated target brake forces FU6, so that the controlled hydraulic brake force FC6 becomes 2 units for the front right wheel 7FR and zero for the front left wheel 7FL. The controlled hydraulic brake forces FC6 for the rear right wheel 7RR and the rear left wheel 7RL are set to the respective compensated target brake forces FU6 remaining as they are without being undertaken by the executed regenerative brake force FG6.

Further, where the operation condition for the regenerative brake device A is mean or moderate, as shown in FIG. 9(C), the regenerative brake force of 1 unit can be exerted at each of the front right wheel 7FR and the front left wheel 7FL, so that the executed regenerative brake force FG6 becomes 2 units in total. Further, the controlled hydraulic brake force FC6 for the front right wheel 7FR becomes 3 units, and the controlled hydraulic brake force FC6 for the front left wheel 7FL becomes 1 unit. The controlled hydraulic brake forces FC6 for the rear right wheel 7RR and the rear left wheel 7RL are set to the respective compensated target brake forces FU6 remaining as they are. Where the operation condition for the regenerative brake device A is insufficient, the executed regenerative brake force FG6 becomes zero, as shown in FIG. 9(D). Accordingly, the controlled hydraulic brake forces FC6 for the respective wheels 7RL, 7FR, 7FL, 7RR are set to the respective compensated target brake forces FU6 remaining as they are.

In the second embodiment, as exemplified in FIGS. 9(A)-9(D), it can be realized to supply the generator motor 20 with the maximum demand regenerative brake force FR5 satisfying the condition that does not provide an excess brake force on the driving wheels. Further, it can be realized to adjust the controlled hydraulic brake force FC6 for the driving wheels (the front right wheel 7FR and the front left wheel 7FL) in dependence on the regeneration brake fore FG6 exerted by the regenerative brake device A. Accordingly, it can be realized to generate the executed regenerative brake force which is the maximum as far as the compensated target brake forces FU6 for the respective wheels 7FR, 7FL, 7RR,7RL are not changed, so that the efficiency in regeneration can remarkably be enhanced.

Various features and many of the attendant advantages in the foregoing embodiments will be summarized as follows:

In the vehicle brake system in the foregoing first embodiment typically shown in FIGS. 1-5, the brake control device 60, 50 which cooperatively controls the hydraulic brake device B and the regenerative brake device A selects a larger one of the driver target brake force FT1 corresponding to the manipulation amount of the braking manipulation member 21 and the compensation brake force FD1 set by the brake control device 60, 50 itself for each wheel, subtracts the base hydraulic brake force FB1 from the selected one brake force to set the compensated target brake force FU1 for each wheel, and distributes the compensated target brake force FU1 to the controlled hydraulic brake force FC for each wheel and the regenerative brake force FG for each driving wheel. Thus, when the compensation brake force FD1 exceeds the driver target brake force FT1, at least a part of the brake force which part corresponds to the surplus is distributed to the regenerative brake device A. This results in bringing the regenerative brake device A into operation though the same has heretofore not been operated when the compensation brake forces FD1 set by the brake control device 60, 50 itself are generated during the active cruise control function or the like, and therefore, the efficiency in regeneration can be enhanced.

Also in the vehicle brake system in the foregoing first embodiment typically shown in FIGS. 1-5, the brake control device 60, 50 which cooperatively controls the hydraulic brake device B and the regenerative brake device A adds the driver target brake force FT1 corresponding to the manipulation amount of the braking manipulation member 21 and the compensation brake force FE1 set by the brake control device 60, 50 itself for each wheel to obtain the sum, subtracts the base hydraulic brake force FB1 from the sum to set the compensated target brake force FU1 for each wheel, and distributes the compensated target brake force FU1 to the controlled hydraulic brake force FC for each wheel and the regenerative brake force FR for each driving wheel. Thus, at least a part of the compensation brake force FU1 is distributed to the regenerative brake device A. This results in bringing the regenerative brake device A into operation though the same has heretofore not been operated when the compensation brake forces FE1 set by the brake control device 60, 50 itself are generated during the brake assist function or the like, and therefore, the efficiency in regeneration can be enhanced.

Also in the vehicle brake system in the foregoing first embodiment typically shown in FIG. 1-4, the distribution control means or section (steps S5-S10 in FIG. 4) compares the right side sum SR of the compensated target brake forces FU1 and the left side sum SL of the compensated target brake forces FU1 and applies the demand regenerative brake force FR which is obtained by the addition of the compensated target brake forces FU1 for the four wheels, to the generator motor 20 if the sums SR, SL are equal, but applies the demand regenerative brake force FR which is obtained by doubling the smaller one of the sums SR, SL if the sums SR, SL differ. Further, in either case, the distribution control means or section subtracts the value which is obtained by dividing the executed regenerative brake force FG by 4, from the respective compensated target brake forces FU1 for the four wheels to set the differences as the controlled hydraulic brake forces FC1 for the four wheels. That is, the distribution control section operates to supply the generator motor 20 with the executed regenerative brake force FG which is the maximum as far as the condition is satisfied that, where the wheels are divided into those on the right side and those on the left side, does not provide an excess braking on the wheels on either side, and to cover the deficiency in the executed regenerative brake force FG which was actually exerted, by the controlled hydraulic brake forces FC1 for the respective wheels. Accordingly, in generating the compensation brake forces FD1/FE1 set by the brake control device 60, 59 itself, it can be realized to make the executed regenerative brake force FG become the maximum as far as the right side sum and the left side sum of the compensated target brake forces are not changed, and therefore, the efficiency in regeneration can remarkably be enhanced.

Further, in the vehicle brake system in the foregoing second embodiment typically shown in FIGS. 1-2 and 8, the distribution control means or section (steps S5A-S10A in FIG. 8) operates to supply to the generator motor 20 the demand regenerative brake force FR5 which is calculated by multiplying the smallest value of the compensated target brake forces FU1 for the driving wheels 7FL, 7RL by the number of the driving wheels 7FL, 7RL, and to distribute the controlled hydraulic brake forces FC5 to the respective wheels based on the executed regenerative brake force FG which was actually exerted by the generator motor 20. That is, the distribution control section operates to supply to the generator motor 20 the demand regenerative brake force FR5 which is the maximum as far as the condition that does not apply an excess braking to the driving wheels 7FL, 7RL is satisfied, and to cover the deficiency in the executed regenerative brake force FG which is actually exerted, by the controlled hydraulic brake forces FC5 for the respective wheels. Accordingly, in generating the compensation brake forces FD1/FE1 set by the brake control device 60, 50 itself, it can be realized to make the executed regenerative brake force FG become the maximum as far as the compensated target brake forces FU1 for the respective wheels are not changed, and therefore, the efficiency in regeneration can remarkably be enhanced.

Obviously, numerous further modifications and variations of the present invention are possible in light of the above teachings. It is therefore to be understood that within the scope of the appended claims, the present invention may be practiced otherwise than as specifically described herein.

What is claimed is:

1. A vehicle brake system comprising:
   a hydraulic brake device having a master cylinder for generating a base hydraulic pressure corresponding to a manipulation amount of a braking manipulation member, a pump for generating a controlled hydraulic pressure, and a hydraulic control unit configured to add a base hydraulic brake force corresponding to the base hydraulic pressure and a controlled hydraulic brake force corresponding to the controlled hydraulic pressure, the hydraulic control unit further configured to control the hydraulic brake device to apply the added brake forces to wheels;
   a regenerative brake device for applying a regenerative brake force to driving wheels which are included in the wheels, the regenerative brake device comprising a generator motor for driving the driving wheels and for generating the regenerative brake force applied to the driving wheels;
   wherein the wheels are four wheels including two front wheels and two rear wheels, the driving wheels being selected as the two front wheels or the two rear wheels; and
   a brake control device configured to cooperatively control the hydraulic brake device and the regenerative brake device;
   wherein the brake control device includes:
   a driver target brake force calculation section for calculating a driver target brake force for each wheel corresponding to the manipulation amount of the braking manipulation member;
   a compensation brake force setting section for enabling the brake control device to set compensation brake forces for the respective wheels independently of the driver target brake force;
   a selection compensation section for selecting a larger one of the driver target brake force and the compensation brake force for each wheel and for subtracting the base hydraulic brake force from the selected one brake force to set a compensated target brake force for each wheel; and
   a distribution control section configured to control the compensated target brake force for each wheel to be distributed to the controlled hydraulic brake force provided by the hydraulic brake device for each wheel and the regenerative brake force provided by the regenerative brake device for each driving wheel;
   wherein the distribution control section includes:
   a left right comparison section for comparing a right side sum made by adding the compensated target brake forces for the front and rear wheels on a right side with a left side sum made by adding the compensated target forces for the front and rear wheel on a left side, each of the compensated target brake forces being calculated by the selection compensation section;
   a left right equal-time distribution control section being operable when the right side sum and the left side sum are equal, for applying to the generator motor a demand regenerative brake force which is obtained by the addition of the compensated target brake forces for the four wheels, acquiring an executed regenerative brake force which was generated by the generator motor, and subtracting a value which is obtained by dividing the executed regenerative brake force by four, from each of the compensated target brake forces for the four wheels to set respective differences as the respective controlled hydraulic brake forces applied by the hydraulic brake device for each wheel; and
   a left right unequal-time distribution control section being operable when the right side sum and the left side sum differ, for applying to the generator motor a demand regenerative brake force which is obtained by doubling a smaller one of the right side sum and the left side sum, acquiring the executed regenerative brake force which was generated by the generator motor, and subtracting a value which is obtained by dividing the executed regenerative brake force by four, from each of the compensated target brake forces for the four wheels to set respective differences as the respective controlled hydraulic brake forces applied by the hydraulic brake device for each wheel.

2. A vehicle brake system comprising:

a hydraulic brake device having a master cylinder for generating a base hydraulic pressure corresponding to a manipulation amount of a braking manipulation member, a pump for generating a controlled hydraulic pressure, and a hydraulic control unit configured to add a base hydraulic brake force corresponding to the base hydraulic pressure and a controlled hydraulic brake force corresponding to the controlled hydraulic pressure, the hydraulic control unit further configured to control the hydraulic brake device to apply the added brake forces to wheels;

a regenerative brake device for applying a regenerative brake force to driving wheels which are included in the wheels, the regenerative brake device comprising a generator motor for driving the driving wheels and for generating the regenerative brake force applied to the driving wheels;

wherein the wheels are four wheels including two front wheels and two rear wheels, the driving wheels being selected as the two front wheels or the two rear wheels; and a brake control device configured to cooperatively control the hydraulic brake device and the regenerative brake device;

wherein the brake control device includes:

a driver target brake force calculation section for calculating a driver target brake force for each wheel corresponding to the manipulation amount of the braking manipulation member;

a compensation brake force setting section for enabling the brake control device to set compensation brake forces for the respective wheels independently of the driver target brake force;

an addition compensation section for adding the compensation brake force for each wheel to the driver target brake force to obtain a sum and for subtracting the base hydraulic brake force from the sum to set a compensated target brake force for each wheel;

a distribution control section configured to control the compensated target brake force for each wheel to be distributed to the controlled hydraulic brake force provided by the hydraulic brake device for each wheel and the regenerative brake force provided by the regenerative brake device for each driving wheel;

wherein the distribution control section includes:

a left right comparison section for comparing a right side sum made by adding the compensated target brake forces for the front and rear wheels on a right side with a left side sum made by adding the compensated target forces for the front and rear wheel on a left side, each of the compensated target brake forces being calculated by the addition compensation section;

a left right equal-time distribution control section being operable when the right side sum and the left side sum are equal, for applying to the generator motor a demand regenerative brake force which is obtained by the addition of the compensated target brake forces for the four wheels, acquiring an executed regenerative brake force which was generated by the generator motor, and subtracting a value which is obtained by dividing the executed regenerative brake force by four, from each of the compensated target brake forces for the four wheels to set respective differences as the respective controlled hydraulic brake forces applied by the hydraulic brake device for each wheel; and a left right unequal-time distribution control section being operable when the right side sum and the left side sum differ, for applying to the generator motor a demand regenerative brake force which is obtained by doubling a smaller one of the right side sum and the left side sum, acquiring the executed regenerative brake force which was generated by the generator motor, and subtracting a value which is obtained by dividing the executed regenerative brake force by four, from each of the compensated target brake forces for the four wheels to set respective differences as the respective controlled hydraulic brake forces applied by the hydraulic brake device for each wheel.

* * * * *